United States Patent [19]

Johnson et al.

[11] Patent Number: 4,898,686
[45] Date of Patent: Feb. 6, 1990

[54] ZINC STABILIZATION WITH MODIFIED ACRYLAMIDE BASED POLYMERS AND CORROSION INHIBITION DERIVED THEREFROM

[75] Inventors: Donald A. Johnson; John E. Hoots; Dodd W. Fong, all of Naperville; Guy A. Crucil, Bloomingdale, all of Ill.

[73] Assignee: Nalco Chemical Company, Naperville, Ill.

[21] Appl. No.: 42,927

[22] Filed: Apr. 27, 1987

[51] Int. Cl.$^4$ .................. C23F 11/18; C23F 11/16
[52] U.S. Cl. .................. 252/389.2; 252/389.52; 252/181
[58] Field of Search .................. 252/389.52, 389.2, 181

[56] References Cited

U.S. PATENT DOCUMENTS

| | | |
|---|---|---|
| 3,709,815 | 1/1973 | Boothe et al. . |
| 3,806,367 | 4/1974 | Lange et al. . |
| 3,837,803 | 9/1974 | Carter et al. .............. 252/389.52 X |
| 3,898,037 | 8/1975 | Lange et al. . |
| 3,928,196 | 12/1975 | Persinski et al. .............. 252/181 X |
| 4,008,164 | 2/1977 | Watson et al. . |
| 4,018,702 | 4/1977 | Buffardi et al. .............. 252/389.52 |
| 4,303,568 | 12/1981 | May et al. . |
| 4,324,684 | 4/1982 | Geiger et al. . |
| 4,411,865 | 10/1983 | Geiger et al. . |
| 4,446,028 | 5/1984 | Becker . |
| 4,460,477 | 7/1984 | Costello et al. . |
| 4,499,002 | 2/1985 | Masler, III et al. . |
| 4,529,572 | 7/1985 | Romberger et al. . |
| 4,532,048 | 7/1985 | Amjad et al. . |
| 4,560,481 | 12/1985 | Hollander .............. 252/181 X |
| 4,566,973 | 1/1986 | Masler, III et al. . |
| 4,588,519 | 5/1986 | Kuhn .............. 252/389.2 |
| 4,640,793 | 2/1987 | Persinski et al. .............. 252/181 X |
| 4,678,840 | 7/1987 | Fong et al. . |
| 4,680,339 | 7/1987 | Fong .............. 525/54.11 |
| 4,705,703 | 11/1987 | Meier et al. .............. 252/389.52 X |
| 4,717,543 | 1/1988 | Sherwood et al. .............. 252/389.2 X |

FOREIGN PATENT DOCUMENTS 93508 11/1983 European Pat. Off. ....... 252/389.52

Primary Examiner—Matthew A. Thexton
Attorney, Agent, or Firm—John G. Premo; Anthony L. Cupoli; Donald G. Epple

[57] ABSTRACT

New zinc stabilizing polymers containing at least 5 mole percent of a monomer represented by the structure:

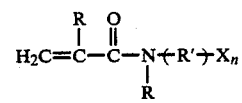

wherein:

R is independently, at each occurrence, chosen from H and lower ($C_1$–$C_4$) alkyl groups;

R' is a hydrocarbonaceous bridging group containing from 1-12 carbon atoms;

X is chosen from —$SO_3M$, —OH, —COOM groups or mixtures thereof,

M is hydrogen or some other cation species; and n ranges from 1-10, are described. Also, the use of these polymers in combination with zinc salts, and in further combination with phosphate salts, to inhibit corrosion of iron containing metals, and other metals, when these metals are exposed to industrial waters is demonstrated. Deposit control or scale inhibition on these metals exposed to industrial waters is also observed.

9 Claims, No Drawings

ZINC STABILIZATION WITH MODIFIED ACRYLAMIDE BASED POLYMERS AND CORROSION INHIBITION DERIVED THEREFROM

Certain polymers have been known in the art which stabilize solutions containing zinc salts dissolved in water against precipitation in the presence of high alkalinity or in the presence of other precipitating anions, such as phosphates. Polymers which have found success in this application include low molecular weight water-soluble polymers containing acrylic acid and/or methacrylic acid, as well as polymers derived from the vinylic carboxylic acids mentioned above in combination with acrylamide, methacrylamide, or other vinylic monomers known in the art. Some other water-soluble polymers which have been found useful for this purpose are polymers that contain acrylic acid and/or acrylamide in combination with N-alkyl-substituted acrylamide.

When polymers of this type have been used in industrial waters in combination with soluble zinc salts in effective amounts, corrosion inhibition is observed on those metallic surfaces, particularly iron and steel surfaces, which are exposed to these industrial waters. Both corrosion inhibition and scale inhibition have been observed when these kinds of polymers have been used in combination with various water-soluble zinc salts and also in the presence of orthophosphate sources. Therefore, the art has shown that zinc salts in combination with certain kinds of zinc-stabilizing polymers and orthophosphate sources are useful as scale inhibitors, corrosion inhibitors, and the like, in industrial waters.

Recently a new series of polymers have been discovered, the use of which allows for additional zinc stabilization in high alkalinity waters. These new polymers have been determined to provide greatly improved corrosion inhibition and scale control where iron or alloys thereof which are exposed to industrial waters are treated with corrosion inhibitor compositions which contain water-soluble zinc salts and soluble phosphates along with these new zinc-stabilizing water-soluble vinylic polymers.

It is an object of this invention to provide a new zinc polymer combination which provides improved corrosion inhibiting properties for iron and steel exposed to industrial waters.

It is also an object of this invention to provide for corrosion inhibitor compositions which contain zinc salts which are soluble in water and additionally contain a certain type of zinc-stabilizing polymer as described below, and the use of these zinc-polymer combinations in further combination with ortho phosphate to greatly inhibit corrosion of iron and steel exposed to industrial waters, and simultaneously inhibit scale formation on these surfaces.

It is another object of this invention that the polymers described above as zinc-stabilizing polymers also particularly inhibit the formation of calcium and magnesium phosphate and/or phosphonate precipitation and used either in the presence or absence of other metallic species, including iron, zinc, manganese, and the like.

THE INVENTION

The new water-soluble vinylic polymers which have now been found to provide zinc stabilization in aqueous media are those polymers containing at least 5 mole percent of a randomly repeating mer unit represented by the formula:

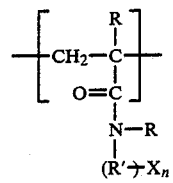

wherein:

R is chosen individually, at each occurrence, from the group consisting of hydrogen, methyl, and ethyl groups;

R' is a multivalent hydrocarbonaceous bridging group containing from 1 to about 12 carbon atoms and which may be linear alkyl, branched alkyl, aryl, alkaryl, aralkyl, cyclic and mixtures thereof;

X is chosen from the group consisting of $-SO_3M$, $-OH$, $-COOM$, and mixtures thereof; and n ranges from 1 to 10; wherein the ratio of zinc salt to zinc-stabilizing polymer ranges between about 100:1 to about 1:100.

M represents an electroneutralizing amount of a cationic species from the group consisting of H, Li, Na, K, Mg, Ca, $NH_4^+$ protonated primary, secondary, or tertiary amines, quaternary amines, mixtures thereof, and the like. As indicated above, to form a corrosion inhibitor composition, the composition must include a water-soluble zinc salt, and a zinc-stabilizing water-soluble vinylic polymer having a molecular weight ranging between about 1,000–100,000 and containing at least 5 mole percent of the mer unit represented by a formula given above as Structure I. The corrosion inhibitor formulations contain a corrosion inhibitor composition comprising:

(a) a water-soluble zinc salt; and (b) a zinc-stabilizing water-soluble vinylic polymer having a molecular weight ranging between about 1,000–100,000 and containing at least five mole percent of a mer unit represented by the formula:

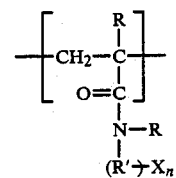

wherein:

R is chosen individually, at each occurrence, from the group consisting of hydrogen, methyl, and ethyl groups;

R' is a multicovalent hydrocarbonaceous bridging group containing from 1 to about 12 carbon atoms and which may be linear alkyl, branched alkyl, aryl, alkaryl, aralkyl, cyclic and mixtures thereof;

X is chosen from the group consisting of $-SO_3M$, $-OH$, $-COOM$, and mixtures thereof; and M is chosen, at each occurrence, from H, Na, K, Mg, Ca, $NH_4$, protonated amines, quaternary amines or mixtures thereof; and n ranges from 1 to 10; wherein the ratio of zinc salt to zinc-stabilizing polymer ranges between about 100:1 to about 1:100.

It is preferred that the corrosion inhibitor composition contain a zinc-stabilizing polymer which additionally contains at least one other mer unit derived from vinylic monomers chosen from the group consisting of acrylic acid or its water-soluble salts, methacrylic acid or its water-soluble salts, acrylamide, methacrylamide, maleic anhydride, maleic acid or its water-soluble salts, methyl vinyl ether, ethyl vinyl ether, maleamide, or mixtures of any of these other monomers, and perhaps may contain other vinylic monomers known in the art.

It is preferred that the corrosion inhibitor composition contain a zinc-stabilizing polymer which has the mer units described above and additionally contains at least 5 mole percent each of either acrylic acid, methacrylic acid, or their water-soluble salts, acrylamide, or mixtures thereof. It is particularly preferred that the corrosion inhibitor composition contain a zinc-stabilizing polymer having at least 5 mole percent of a monomer represented by the formula:

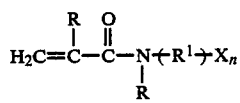

wherein:

R, R', X, and n have the same meanings as previously described, and additionally contains at least 5 mole percent of each of the monomers acrylic acid or its water-soluble salts and acrylamide. The acrylic acid water-soluble salts can be the acrylate salts of sodium, potassium, lithium, ammonium, protonated primary amines such as methyl amine, protonated secondary amines, protonated tertiary amines, or quaternary amines, as well as magnesium, calcium, or mixtures thereof, and the like.

Specific examples of the monomer found to provide excellent zinc-stabilizing capacity are presented in Table 1. As one can see, Table 1 presents various kinds of substituted acrylamide monomers or substituted methacrylamide monomers that contain substituent groups chosen from the sulfonate group, the alcohol group, the carboxylic acid group, water-soluble salts thereof, and/or any mixtures thereof.

Although specific examples of a monomer or a randomly repeated mer unit is presented in Table 1, the polymers useful in this invention can be obtained either by vinylic polymerization of the represented mer unit or may also be obtained by modifying pendent amide containing polymers, such as polymers derived from the polymerization of acrylamide or methacrylamide. These types of polymers may be modified by certain reactions with functionally substituted amines to derive a transamidation product and would be represented by structure similar to the polymers that would be derived from the same vinylic polymerization mentioned above. The polymers found useful in this invention, therefore, can be derived by vinylic polymerization of monomers represented in Table 1 if these monomers are available, or they may also be derived by transamidation of pendent acrylamide or methacrylamide containing polymers by using in the transamidation reaction with a substituted amine containing sulfonate, carboxylate and/or other functional groups as represented above, to derive the substitution indicated in Table 1.

Although both vinylic polymerization techniques of monomers represented in Table 1, by themselves or in combination with other vinylic monomers as indicated above, or the transamidation of a preformed pendent amide containing polymer, as above described, or other techniques such as the synthesis of the mer unit by a transamidation technique or any other synthesis technique prior to the polymerization of said mer unit, or other synthetic techniques for deriving polymers that would contain the equivalent of the monomer or mer unit represented in Table 1 is anticipated to obtain the polymers of this invention, other synthesis techniques could be used according to the knowledge of the artisan to obtain the polymers of this invention, and we do not intend necessarily to be limited by the synthetic techniques chosen to synthesize these polymers.

TABLE 1

For purposes of this patent application, the following abbreviations represent the monomer (or mer unit) indicated:

| Abbreviation | Monomer (Mer Unit) |
|---|---|
| AMS | $$CH_2=C(R)-C(=O)-N(H)(CH_2-SO_3M)$$ where R is H, CH$_3$ and M is H, Na, K, NH$_4$ or other water-soluble cationic salt. |
| 2-AES | $$CH_2=C(R)-C(=O)-NH-CH_2-CH_2-SO_3M$$ |
| HAPS | $$CH_2=C(R)-CNH-CH_2CH(OH)CH_2-SO_3M$$ |
| 2-ABDA | $$CH_2=C(R)-CNH-CH(COOM)-CH_2COOM$$ |
| 6-AHA | $$CH_2=C(R)-CNH-CH_2(CH_2)_3-CH_2COH$$ |
| AMPD | $$CH_2=C(R)-CNH-C(CH_3)(CH_2OH)-CH_2OH$$ |
| APD | $$CH_2=C(R)-CNH-CH_2-CH(OH)-CH_2OH$$ |
| MEA | $$CH_2=C(R)-CNH-CH_2CH_2OH$$ |
| PASA | $$CH_2=C(R)-CNH-CH_2CH(CO_2M)-CH_2SO_3M$$ |
| THMAM | $$CH_2=C(R)-CNH-C(CH_2OH)_2-CH_2OH$$ |

TABLE 1-continued

For purposes of this patent application, the following abbreviations represent the monomer (or mer unit) indicated:

| Abbreviation | Monomer (Mer Unit) |
|---|---|
| 4-AP | $CH_2=\overset{R}{C}-\overset{O}{C}NH-\underset{}{C_6H_4}-OH$ |
| 2AAA | $CH_2=\overset{R}{C}-\overset{O}{C}NH-CH_2CO_2H$ |
| Tyro | $CH_2=\overset{R}{C}-\overset{O}{C}NH-\overset{CO_2M}{CH}-CH_2-C_6H_4-OH$ |
| Leu | $CH_2=\overset{R}{C}-\overset{O}{C}NH-\overset{CO_2M}{CH}-\underset{CH_3}{CH}-CH_3$ |
| PA | $CH_2=\overset{R}{C}-\overset{O}{C}NH-\overset{CO_2M}{CH}-CH_2-C_6H_5$ |
| CYS | $CH_2=\overset{R}{C}-\overset{O}{C}NH-\overset{CO_2M}{CH}-CH_2SO_3M$ |

Of these nitrogen modified and substituted acrylamide or methacrylamide compounds, it is particularly noted that compounds containing nitrogen substitution derived from aspartic acid, taurine, 2-aminomethyl-1,3-propane diol, aminomethylsulfonic acid, 4-aminophenol, 4-amino benzoic acid, 1-amino 2,3-propanediol, tris(hydroxymethyl)aminomethane, 2-amino-2-methyl-1-hydroxypropane, monoethanol amine, 2-amino-2-methyl-1,3-propanediol, 6-aminohexanoic acid, 2-amino acetic acid, 2-amino-butanedioic acid, N-methylbutylamine, n-propylamine, 2-hydroxy-3-amino propanesulfonic acid, 2-aminoethanesulfonic acid, 4-amino phenylsulfonic acid, and the like.

These corrosion inhibitor compositions are particularly effective when the polymer also acts as a calcium phosphate inhibitor. This action as a calcium phosphate inhibitor is primarily measured in the absence of zinc ions in aqueous solutions. Therefore, the corrosion inhibitor composition described above contains polymers referred to as zinc-stabilizing polymers, which polymers also in and of themselves when added to water in an effective amount for the purpose of inhibiting the precipitation of calcium phosphate, do so.

Calcium phosphate inhibition is particularly important since the corrosion inhibiting effectiveness of the zinc-polymer complex is enhanced in the presence of orthophosphate anion, or a phosphorous-containing compound which can hydrolyze to form orthophosphate anions in the industrial water. To be most effective, the ratio of zinc to orthophosphate to polymer should range between about 10:1:1 to about 1:25:100. The range of zinc to orthophosphate to polymer is preferably between about 2:1:1 to about 1:10:50, and most preferably between about 1:1:1 to about 1:10:10.

For the purposes of this disclosure the following copolymers or terpolymers have been found to be particularly useful:

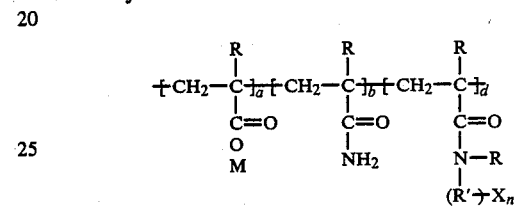

wherein R, R', X, and n have the meanings described above and wherein M=H, Na, K, Li, $NH_4^+$, $N^+R_3H$, $NR_4^+$, and the like, or mixtures thereof; and a, b, d are integers having the following relationships:
a:d may range from 0 to 100;
b:d may range from 0 to 100
d:(a+b) may range from 0.01 to 100, and wherein the sum a+b+d is sufficient to achieve a moleclar weight ranging from about 1000 to about 100,000, preferably between about 2,500 to about 85,000, and most preferably between about 5,000 to about 75,000.

Finally, the scale inhibiting and corrosion inhibiting zinc—polymer—orthophosphate combination may be admixed together in a single product formulation containing all these ingredients, or sources, or they may be added to the industrial waters incrementally or separately, as required. To better demonstrate the invention, the following tables are presented.

TABLE 2

| Composition | Mw(H2O) | Mer Units (mol %) | | | % Calcium Phosphate Inhibition | | | Fe 2+* Tolerance | RPO3H2** Inhibition ppm polymer 15 | Zn2+*** Stabilization ppm polymer | | |
|---|---|---|---|---|---|---|---|---|---|---|---|---|
| | | AA | AM | X | 5 | 7.5 | 10 | | | 5 | 10 | 15 |
| AA/Am/AMS | 71200 | 23 | 73 | 4 | 55 | | 92 | 57 | 100 | 10 | 25 | 39 |
| AA/Am/AMS | 67600 | 13 | 78 | 9 | 88 | | 91 | 50 | 99 | 20 | 57 | 76 |
| AA/Am/AMS | 7200 | 39 | 51 | 10 | 11 | | 72 | 11 | | 16 | 90 | 76 |
| AA/Am/AMS | 11300 | 81 | 9 | 10 | 15 | | 99 | 4 | | 65 | 88 | 77 |
| AA/Am/AMS | 43500 | 17 | 60 | 22 | 13 | | 91 | 4 | | 24 | 68 | 67 |
| AA/Am/AMS | 7900 | 45 | 26 | 28 | 20 | | 88 | 94 | | 62 | 80 | 78 |
| AA/Am/AMS | 69300 | 33 | 27 | 40 | 79 | 97 | 86 | 76 | | 4 | 76 | 76 |
| AA/Am/AMS | 81700 | 37 | 23 | 41 | 94 | 96 | 94 | 93 | 100 | 22 | 76 | 75 |
| AA/2-AES | 30800 | 95 | | 5 | 30 | 94 | 99 | 12 | | 66 | 90 | 90 |
| AA/Am/2-AES | 45300 | 52 | 40 | 7 | 70 | | 93 | 96 | 100 | 10 | 89 | 92 |
| AA/Am/2-AES | 53800 | 78 | 11 | 11 | 0 | | 94 | 51 | | 29 | 89 | 89 |
| AA/Am/2-AES | 43200 | 34 | 54 | 11 | 91 | | 99 | 74 | 100 | 11 | 79 | 82 |
| AA/Am/2-AES | 10600 | 60 | 25 | 15 | 38 | 99 | | 10 | | 23 | 82 | 85 |
| AA/Am/2-AES | 48400 | 27 | 27 | 46 | 94 | | 100 | 76 | | 36 | 87 | 87 |
| AA/Am/2-AES | 44100 | 19 | 27 | 54 | 97 | | 99 | 89 | 3 | 11 | 25 | 45 |
| AA/HAPS | 32700 | 95 | | 5 | | | 41 | | | | 69 | |

TABLE 2-continued

| Composition | Mw(H2O) | Mer Units (mol %) | | | % Calcium Phosphate Inhibition Dosage Curves ppm Polymer | | | Fe 2+* Tolerance | RPO3H2** Inhibition ppm polymer 15 | Zn2+*** Stabilization ppm polymer | | |
|---|---|---|---|---|---|---|---|---|---|---|---|---|
| | | AA | AM | X | 5 | 7.5 | 10 | | | 5 | 10 | 15 |
| AA/Am/HAPS | 17400 | 80 | 5 | 15 | 9 | | 99 | 21 | | 68 | | |
| AA/Am/HAPS | 43100 | 31 | 49 | 20 | 70 | 90 | 95 | 32 | | 16 | 73 | 72 |
| AA/Am/HAPS | 25800 | 50 | 15 | 35 | | | 84 | 47 | | | 52 | |
| AA/Am/HAPS | 28600 | 20 | 10 | 70 | | | 89 | 95 | | 32 | | |
| AA/Am/2-AAA | 38600 | 85 | 5 | 10 | | | 4 | | 0 | | 19 | |
| AA/Am/2-ABDA | 13500 | NA | NA | 12 | 8 | 89 | 100 | 35 | 0 | | 63 | |
| AA/Am/6-AHA | 14100 | 50 | 35 | 15 | 8 | 94 | 98 | 88 | 2 | | 75 | |
| AA/Am/AMPD | 16000 | 75 | 15 | 10 | | 23 | 82 | 22 | 0 | | 62 | |
| AA/APD | 32300 | 70 | 30 | | | | 4 | | | 0 | | |
| AA/Am/APD | 14600 | 51 | 32 | 17 | 10 | 75 | 98 | 10 | 0 | | 71 | |
| AA/Am/MEA | 11700 | 45 | 40 | 15 | | | 98 | 17 | | | 66 | |
| AA/Am/MEA | 56000 | 50 | 30 | 20 | 11 | 67 | 90 | 38 | 96 | | 60 | |
| AA/PA | 31300 | 95 | | 5 | | | 3 | | | | 55 | |
| AA/Am/PA | 11000 | 45 | 40 | 15 | | 97 | 98 | | | 6 | | 98 |
| AA/Am/THMAM | 11600 | 45 | 50 | 5 | | | 99 | | | 0 | | 70 |
| AA/HPA | 7400 | 75 | | 25 | 13 | | 50 | 11 | | 4 | 82 | 76 |

*Initial Concentration of Fe+2 = 3 ppm
**5.6 ppm HEDP and 8ppm PBTC (as acid actives) are included in test solution and 15 ppm of polymer actives were used based on the added severity of the test
***5 ppm Zn+2 (as Zn) was present
****Am = acrylamide
*****HPA = hydroxypropyl acrylate
NA = Not Available
Fe+2 tolerance is synonymous to calcium phosphate inhibition-iron sensitivity which definition and explanation appears in the Hoots and crucil paper incorporated by reference below.

Test Procedures follows the teachings in a paper entitled "Role of Polymers in the Mechanism and Performance of Alkaline Cooling Water Programs", Hoots and Crucil, NACE Corrosion, '86, Paper No. 13, Mar. 17, 1986, which paper is incorporated herein by reference.

In Table 2, the representation of % calcium phosphate inhibition; Fe 2+ tolerance is meant to indicate the results of a performance test in which the polymer compositions shown are tested in the presence of 3 ppm ferrous iron and the normal concentration of polymer earlier indicated. Percent inhibition is calculated as the percent precipitate filtered from the test solution minus the percent precipitate filtered from a blank, divided by the percent precipitate unfiltered minus the blank times 100. This so-called Fe 2+ tolerance is identical to the term calcium/PO4 inhibition-iron sensitivity described in the article, "Role of Polymers in the Mechanism and Performance of Alkaline Cooling Water Programs", Hoots and Crucil, NACE Corrosion'86, Paper No. 13, Mar. 17, 1986, which paper was incorporated earlier by reference. In this paper, calcium/PO4 inhibition-iron sensitivity is defined as including concepts such as the following:

"Depending upon the source of makeup water and the cycles of concentration, significant levels of orthophosphate can occur in industrial cooling water systems. Due to the high pH/alkalinity levels used for corrosion control, the polymeric scale inhibitor needs to effectively inhibit and disperse calcium phosphate. In addition, noticeable levels of soluble ferrous iron and colloidal iron oxides can also be present. In benchtop tests, those materials have degraded the performance of all calcium phosphate inhibitors studied. Diminishing the effects of iron is also a factor to consider."

Therefore, the tests in Table 2 specifically show an iron tolerance test in the presence of calcium and phosphate and in the presence of the particular polymers of the instant invention.

In these tests, the higher the number, the better the results because it indicates that calcium phosphate inhibition is not inhibited by the presence of ferrous iron.

TABLE 3

| Ratio Zn:PO4:Polymer | PCT TEST | Concentration of Polymer | pH | Return Water Temperature | Water Hardness ppm as (CaCO3) | Corrosion (mpy) | | | Deposition (mg/day) | | |
|---|---|---|---|---|---|---|---|---|---|---|---|
| | | | | | | MS | ADM | SS | MS | ADM | SS |
| 1:4:6 | 1 | 6.0 ppm of A | 8.5 | 120° F. | 560 | 1.9 | 0.1 | 0 | 33.3 | 2.8 | 9.8 |
| 2:8:4 | 2 | 4.0 ppm of A | 7.8 | 120° F. | 200 | 1.2 | 0.2 | 0 | 21.0 | 2.2 | 6.5 |
| 2:8:7.5 | 3 | 7.5 ppm of A | 7.5 | 120° F. | 1300 | 1.2 | 0.1 | 0 | 11.1 | 0.7 | 0.5 |
| 1:4:6 | 4 | 6.0 ppm of A | 8.5 | 120° F. | 560 | 1.6 | 0.1 | 0 | 19.4 | 2.4 | 0.8 |
| 2:8:4 | 5 | 4.0 ppm of B | 7.8 | 120° F. | 200 | 1.6 | 0.2 | 0 | 20.1 | 2.9 | 2.7 |
| 2:8:7.5 | 6 | 7.5 ppm of B | 7.5 | 120° F. | 1300 | 1.2 | 0.1 | 0 | 16.6 | 4.2 | 2.1 |

A = 49 mole % Acrylic Acid, or its water soluble salt
29 mole % Acrylamide
22 mole % AMS
Molecular Weight = 32,100
B = 60 mole % Acrylic Acid, or its water-soluble salt
25 mole % Acrylamide
15 mole % AMS
Molecular Weight = 16,400

Prior tests using other water-soluble polymers in combination with zinc salts in the presence of orthophosphate gave the following results:

TABLE 4

| PCT TEST | Conc. (ppm) of Polymer | pH | Water Hardness, ppm as (CaCO₃) | Corrosion (mpy) MS | Deposition (mg/day) MS |
| --- | --- | --- | --- | --- | --- |
| A* | 6 of Acrylic Acid/EA (80/20) | 8.5 | 450–650 | 4.7 | 60.3 |
| B** | 6 of Acrylic acid methylacrylate (80/20) | 8.5 | 450–650 | 7.1 | 99.5 |
| C*** | 6 of Acrylic acid homopolymer | 8.5 | 450–650 | 3.0 | 52.5 |
| D (only Zn + PO₄) | No Polymer | 8.5 | 450–650 | 6.1 | 102.4 |
| E (No Zinc) | 6.0 ppm A } with 2.0 ppm C } PO₄ @ 4.0 ppm | 8.5 | 450–650 | 11.8 | 145 |

EA = ethyl acrylate
*Zinc + phosphate @ 1 ppm and 4 ppm respectively
**Zinc + phosphate @ 1 ppm and 4 ppm respectively
***Zinc + phosphate @ 1 ppm and 4 ppm respectively In Table 2, various copolymers and terpolymers have been tested for both calcium phosphate inhibition, iron tolerance, phosphonate antagonism, and zinc stabilization. The results indicate that polymers of acrylic acid, acrylamide, and the monomer described as AMS, are particularly of value.

Also, copolymers and terpolymers containing acrylic acid or acrylic acid, acrylamide, and the monomer referred to as 2-AES, are also seen to be particularly effective for both calcium phosphate inhibition and zinc stabilization.

Finally, copolymers and/or terpolymers containing acrylic acid or its water-soluble salts, or polymers containing acrylic acid, acrylamide and the monomer referred to as HAPS, are also seen to be effective for calcium phosphate inhibition and zinc stabilization. Other polymers, as described in Table 2, are seen to be effective calcium phosphate inhibitors and/or effective zinc stabilizers. A combination of these polymers with zinc is also demonstrated to be good corrosion inhibitor when placed in industrial waters in corrosion inhibiting effective amounts, and these industrial waters are exposed to iron, carbon steels, stainless steels, and other metallic alloys.

As can be seen, the molecular weights of these polymers normally run between about 1,000 and about 100,000, preferably run between about 2,500 and about 85,000, and mot preferably run between about 5,000 and about 75,000.

Table 3 shows the use of certain of the formulations of the invention in pilot cooling towers. The pilot cooling tower systems are described in a paper presented at the 38th Annual Meeting of the INTERNATIONAL WATER CONFERENCE held in Pittsburgh, Pa., during November 1975, which paper is incorporated herein by reference. The test results show both corrosion results and deposition results on different metals under different conditions, which include pH, return temperatures of recirculating cooling test waters, hardness content of water in terms of ppm calcium carbonate, and treatment levels of individual polymers which are respectively composed of 49 mole percent acrylic acid, 29 mole percent acrylamide, 22 mole percent of AMS mer unit (Polymer A) and 60 mole percent acrylic acid, 25 mole percent acrylamide, 15 mole percent AMS mer unit (Polymer B). In one case (Polymer A), the molecular weight is about 32,100; in the other case (Polymer B), the molecular weight is about 16,400.

A comparison of results presented in Tables 3 and 4 indicates that greatly improved corrosion inhibition and deposit control (or scale inhibition) is observed using the combination of zinc, orthophosphate, and the new polymers represented by the Polymers A and B. It is anticipated that similar improved results will be observed when substituting the other polymers of this invention, which polymers may contain effective amounts of the monomer (or mer units) described above, particularly in Table 1.

Having described our invention, we claim:

1. A corrosion inhibitor composition comprising:
   (a) a water soluble zinc salt; and
   (b) a zinc-stabilizing water soluble vinylic terpolymer having a molecular weight ranging between about 2500 to about 85,000, which polymer contains at least five mole percent of a repeating mer unit represented by the formula:

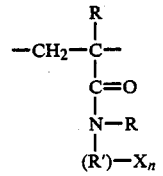

wherein R is chosen individually, at each occurrence, from the group consisting of hydrogen, methyl and ethyl groups;

R' is a multicovalent hydrocarbonaceous bridging group containing from 1–12 carbon atoms and which be linear alkyl, aryl, cyclic and mixtures thereof; and X is chosen from the group consisting of —SO₃M, —COOM, and mixtures thereof; and n ranges from 1–10; and M is chosen from the group consisting of hydrogen, metallic cations, protonated amines, quaternary amines and mixtures thereof; and which polymer also contains at least ten mole percent of a mer unit chosen from the group consisting of acrylic acid, methacrylic acid, maleic anhydride, maleic acid and mixtures thereof; and further, which polymer also contains at least ten mole percent, of a mer unit chosen from the group consisting of acrylamide, methacrylamide, methyl vinyl ether, ethyl vinyl ether, maleimide, and mixtures thereof; and wherein the ratio of zinc salt(a) to zinc stabilizing polymer(b) ranges between about a:b between about 100:1 and, wherein (a) and (b) are combined with (c) an orthophosphate or orthophosphate source, such that the ratio of a:b:c: ranges between about 10:1:1 to about 1:10:100.

2. The corrosion inhibitor of claim 1 wherein the zinc-stabilizing polymer contains at least five mole percent each of acrylic acid and acrylamide.

3. The corrosion inhibitor composition of claim 2 wherein the zinc stabilizing polymer contains at least five mole percent of at least one monomer chosen from the group consisting of AMS, 2-AES, 2ABDA, 6-AHA, PASA and CYS.

4. The corrosion inhibitor composition of claim 1 wherein the zinc stabilizing polymer contains at least five mole percent each of the mer units obtained from the monomers acrylic acid, acrylamide and AMS.

5. The corrosion inhibitor composition of claim 1 wherein the zinc stabilizing polymer contains at least 10 mole percent each of the mer units obtained from the monomers acrylic acid, acrylamide and 2-AES.

6. The corrosion inhibitor composition of claim 1 wherein the zinc stabilizing polymer contains at least 10 mole percent each of the mer units obtained from the monomers acrylic acid, acrylamide and 2-ABDA.

7. The corrosion inhibitor composition of claim 1 wherein the zinc stabilizing polymer contains at least 10 mole percent each of the mer units obtained from the monomers acrylic acid, acrylamide and PASA.

8. The corrosion inhibitor composition of claim 1 wherein the zinc stabilizing polymer contains at least 10 mole percent each of the mer units obtaned from the monomers acrylic acid, acrylamide and CYS.

9. The corrosion inhibitor composition of claim 1 wherin the zinc stabilizing polymer contains at least 10 mole percent each of the mer units obtained from the monomers acrylic acid, acrylamide and 6-AHA.

* * * * *